William A. Ives' Impt in Auger Handle

110920

PATENTED JAN 10 1871

Witnesses
J. H. Shumway
A. J. Tibbits

William A. Ives
Inventor
By his Attorney
John E. Earle

UNITED STATES PATENT OFFICE.

WILLIAM A. IVES, OF NEW HAVEN, CONNECTICUT.

Letters Patent No. 110,920, dated January 10, 1871.

IMPROVEMENT IN AUGER-HANDLES.

The Schedule referred to in these Letters Patent and making part of the same.

*To all whom it may concern:*

Be it known that I, WILLIAM A. IVES, of New Haven, in the county of New Haven and State of Connecticut, have invented a new Improvement in Auger-Handles; and I do hereby declare the following, when taken in connection with the accompanying drawing and the letters of reference marked thereon, to be a full, clear, and exact description of the same, and which said drawing constitutes part of this specification, and represents in—

Figure 1:
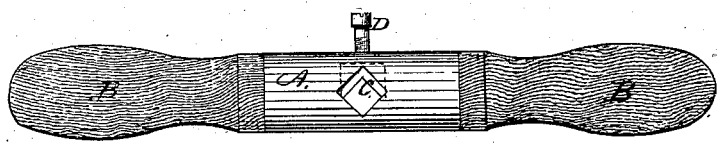
Figure 2:
Figure 3:

Figure 1, a top view;
Figure 2, a transverse vertical section; and in
Figure 3, the follower detached.

This invention relates to an improvement in handles for augers, the object being to make the handle adjustable to different augers.

This has heretofore been done by various devices, in nearly all of which a follower is arranged to run longitudinally in the handle, the result of which is, that if the shank of the auger be tapering, it is difficult to set the handle at right angles to the auger.

To overcome this difficulty is the object of my invention; and

It consists in the arrangement of a shoe or follower within a central cylinder on the handle, the movement of the said follower being transversely across the opening in the handle formed to receive the auger, and the said follower operated by a set-screw or other suitable device.

A is a central metallic cylinder, into each end of which a wood handle, B, is fitted and firmly secured, the handles extending into the cylinder only so far as to leave a space in the center, into which is set the follower C, the end of the handles retaining the follower in a central position.

The cylinder is perforated to receive the shank of the auger in the usual manner, and the follower is formed with an angle corresponding to the angle of the opening, and the follower is prevented from falling transversely out of position by studs *a* formed or fixed within the cylinder, as seen in fig. 2, in such position that, while sufficient play is allowed to the follower transversely, it cannot tip up or down out of place.

A set-screw, D, or other device, is arranged in the cylinder to force the follower against the shank of the auger when inserted through the perforation in the cylinder.

By this construction, no matter what the shape of the shank of the auger, the follower will adapt itself to that shape, the handle "rolling" until a firm bearing is attained above and below on the cylinder, and the perforation in the cylinder being directly one over the other, insures the position of the handle always at right angles to the auger.

I do not wish to be understood as broadly claiming an auger-handle with an angular hole transversely through the middle, and provided with a set-screw, as such is not new, as will be seen by reference to patent No. 97,830.

I claim as my invention—

The arrangement of the follower C within the perforated cylinder A, formed to correspond to the said perforations, and operated by a set-screw, or equivalent device, to secure the auger in the said perforations, substantially as herein described.

W. A. IVES

Witnesses:
A. J. TIBBITS,
J. H SHUMWAY.